July 14, 1931.   R. V. TERRY   1,814,269
PORTABLE TALKING MOTION PICTURE PROJECTOR
Filed Aug. 8, 1928   3 Sheets-Sheet 1

INVENTOR
Roy V. Terry
BY
G. H. Heydt
ATTORNEY

July 14, 1931. R. V. TERRY 1,814,269
PORTABLE TALKING MOTION PICTURE PROJECTOR
Filed Aug. 8, 1928 3 Sheets-Sheet 3

INVENTOR
Roy V. Terry
BY
G. H. Heydt
ATTORNEY

Patented July 14, 1931

1,814,269

UNITED STATES PATENT OFFICE

ROY V. TERRY, OF MONTCLAIR, NEW JERSEY, ASSIGNOR TO BELL TELEPHONE LABORATORIES, INCORPORATED, OF NEW YORK, N. Y., A CORPORATION OF NEW YORK

PORTABLE TALKING MOTION PICTURE PROJECTOR

Application filed August 8, 1928. Serial No. 298,275.

This invention relates to talking motion picture equipment and more particularly to apparatus suitable for use with a film which bears both a picture record and a sound record.

It is an object of this invention to provide an extremely compact machine so that the electric driving motor, the picture projector, the sound reproducer with its accompanying vacuum tube amplifier, and the supply and take-up reel magazines may be mounted in a minimum of space, but with due regard to accessibility.

It is a further object of the invention to produce a combined picture and sound projector so housed and of such weight that it lends itself readily to transportation by hand. That is to say, the device approximates in size and convenience of handling the previously known "suit-case" or "portable" projectors.

A feature of the invention resides in the particular arrangement of the component parts of the mechanism.

A further feature is found in the manner in which the optical system of the sound reproducing apparatus is shielded from illumination from light sources other than the lamp provided for that specific purpose.

A desirable result is obtained by utilizing the lamp of the sound reproducing equipment as a light source for the general illumination of the cabinet interior, thus providing a working light for the various adjustments and control of the device, as for example, during the threading of the film into the machine.

An added feature is introduced by the electrical shielding of various parts of the apparatus by means of supplemental metallic casings, which guard the electrical equipment of the sound reproducing device against electrical disturbances.

A more complete understanding of the invention may be obtained from the following detailed description, reference being had to the accompanying drawings.

Figure 1:
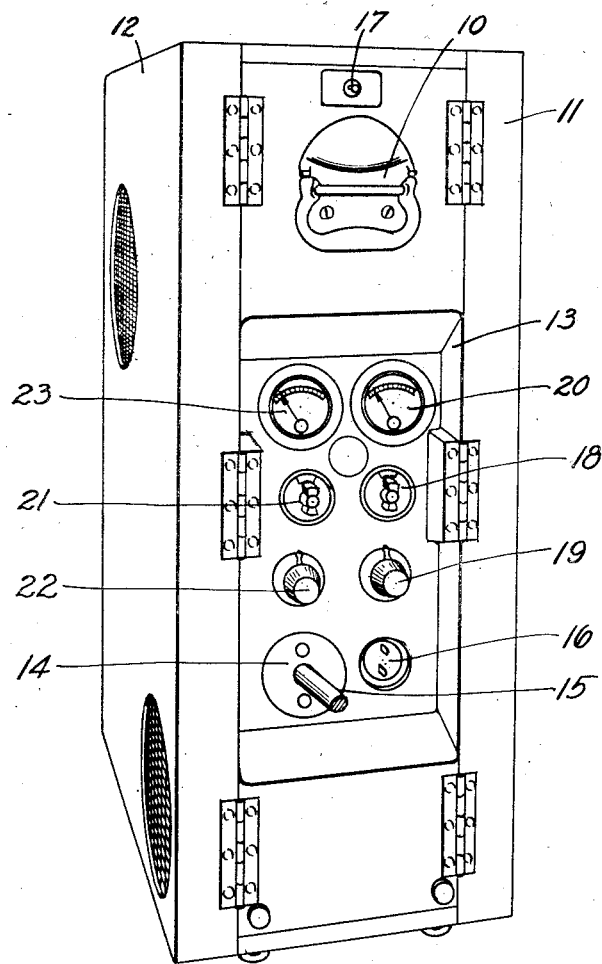

Referring now to the drawings, Fig. 1 is an exterior view of the cabinet which houses the device and shows the control panel and the manner in which the sides of the cabinet are hinged.

Figure 2:
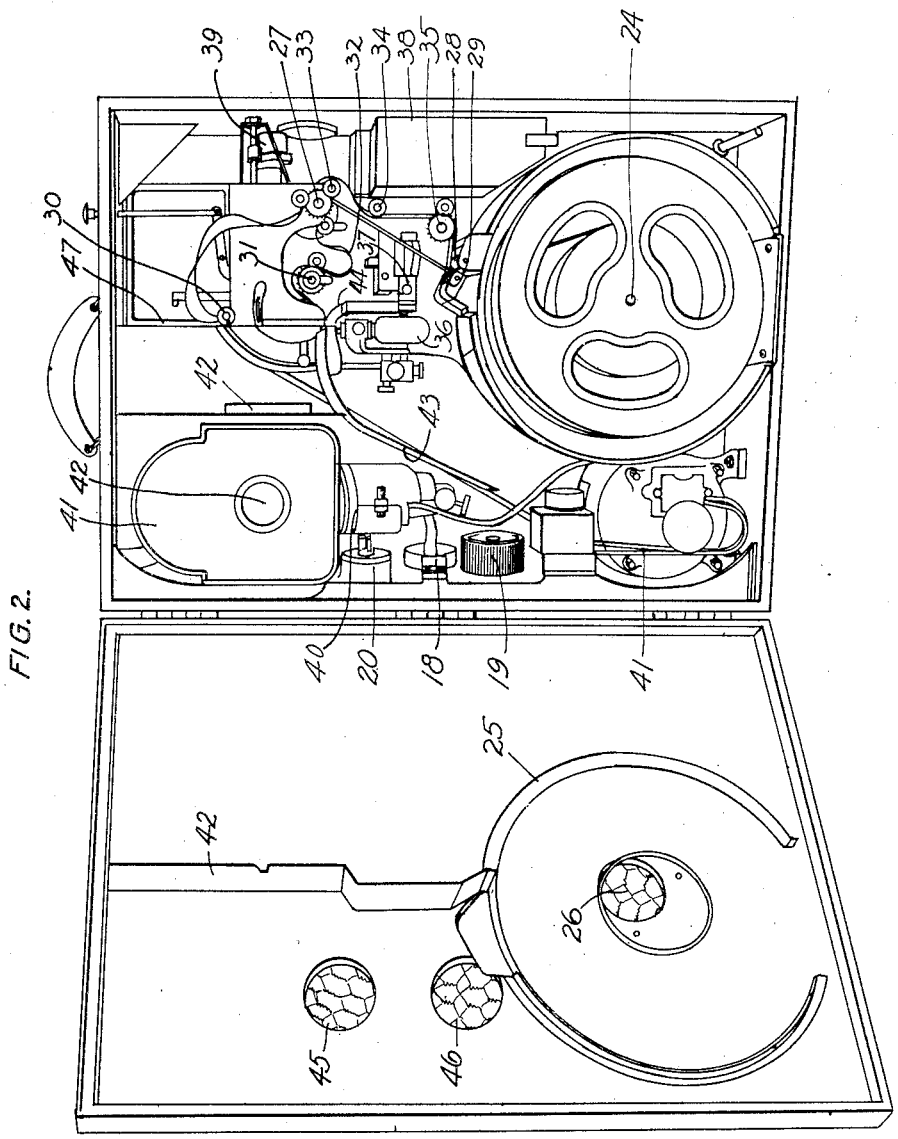

Fig. 2 is an interior view of the right hand side of the machine. This view shows the location and lamp of the picture projection mechanism with objective lens therefor as well as the sound reproducing equipment, the reel magazine and the driving motor.

Figure 3:
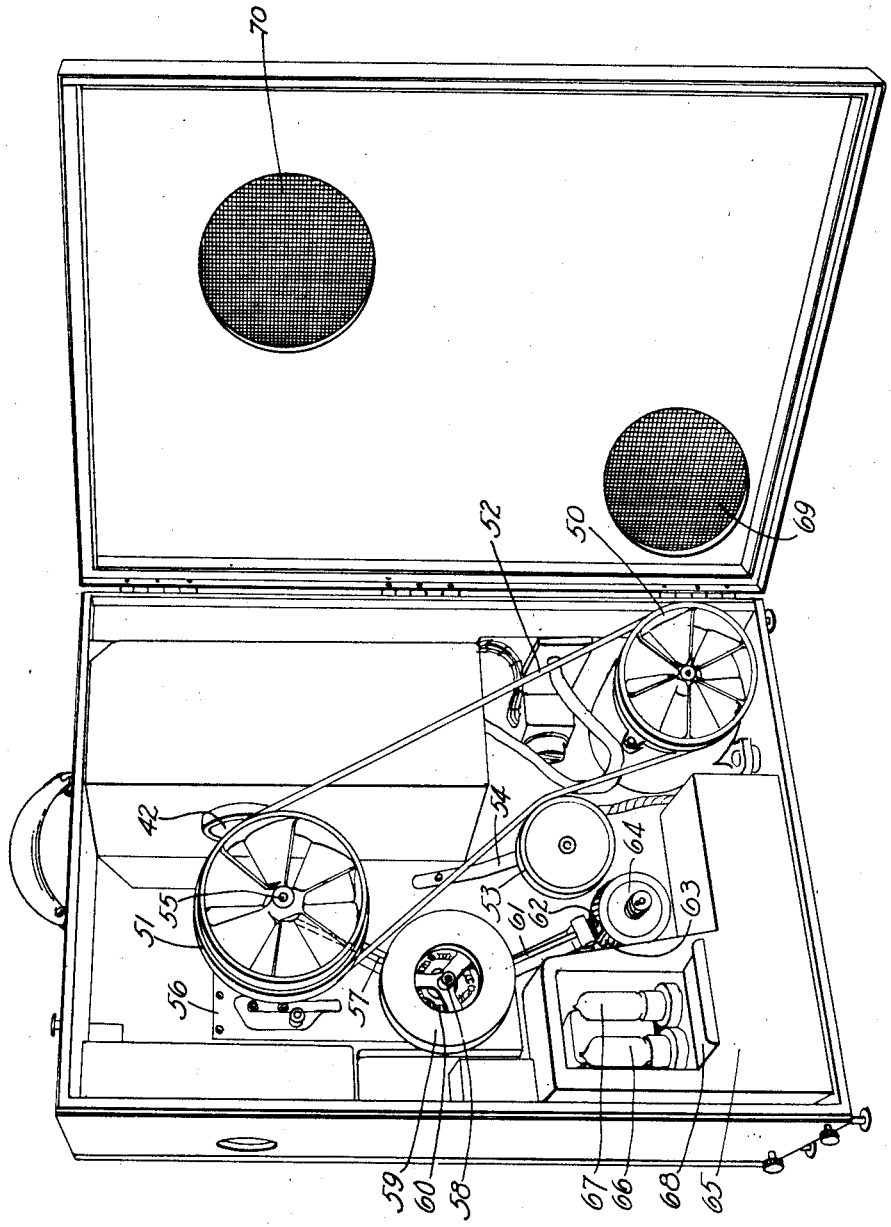

Fig. 3 is a left hand view of the cabinet interior. This view shows the driving connections for the various parts of the machine. The manner in which the photoelectric cell amplifier is mounted and shielded is also disclosed in this view.

As shown in Fig. 1 the cabinet is provided with a handle 10 whereby it may be readily transported. There is a corresponding handle on the front panel of the cabinet. Doors 11 and 12 are hinged to the rear panel and form the sides of the cabinet. A controlling switchboard is indicated at 13 and includes a plug and jack connection 14 by means of which battery supply is provided for the photoelectric cell amplifier. Battery supply is by means of a multiconductor cable indicated at 15 which provides enough conductors to supply A and B battery potentials to the amplifier. A terminal pair is indicated at 16. Connection to this terminal pair may be made by means of a two conductor plug and it is by means of these contacts that a suitable source of power is introduced for the operation of the electric driving motor which forms the prime mover of the device and also for the powerful incandescent lamp which serves as an illuminant for the picture projector. The motor and projecting lamp are connected in parallel and are controlled by a tumbler switch 17 which is located near the top of the cabinet.

A controlling snap switch 18 is provided for closing the circuit of the lamp of the sound reproducing system. The current supply to this lamp may be controlled by means of a rheostat, the control knob for which is shown at 19. An ammeter 20 is provided to show the current flow in this lamp circuit.

A snap switch 21 controls the filament circuit of the vacuum tube amplifier. Current flow in this filament circuit may be regulated by means of a rheostat, the control knob for which is indicated at 22. The amount of current flowing in this circuit may be observed by reading a milliammeter 23.

Referring now to Fig. 2, a drum shaped reel magazine is mounted in the lower forward portion of the cabinet. This reel magazine is of sufficient depth to hold both feed and take-up reels. The take-up reel is mounted on the inside of the machine and has a driving connection to shaft 24. Shaft 24 is driven by means of the usual slip-clutch mechanism well known for this purpose in the art. The feed reel is loosely mounted on shaft 24 and rotated only by the pull of the film. The cabinet door is provided with a flanged ring 25 which acts to make a tight seal for the reel magazine. An inspection window 26 permits observation of the reels during the operation of the machine.

In operation film is drawn from the feed reel by means of constantly rotating sprocket 27 which forms part of the picture projecting mechanism. The picture projecting mechanism will not be described in detail since it is of a type well known in the art and of itself forms no part of the present invention. The projector illustrated is of a type well known commercially as the DeVry projector. After leaving the feed reel the film passes between anti-friction rollers 28 and 29 which also serve as a fire guard. Beyond the sprocket 27 a loose loop of film is formed after which the film passes over an anti-friction roller 30, through the aperture gate of the projector mechanism and thence over an intermittently driven sprocket. The pressure gate is shown open in the present view. The intermittently actuated sprocket is shown at 31. After passing over the intermittently operated sprocket a loose loop of film is provided at 32 after which the film passes over an anti-friction idler 33 and thence to a sprocket 34 after which it passes the aperture plate and pressure gate of the sound reproducing equipment. The film is drawn through the pressure gate of the sound reproducing equipment by means of a constantly rotating sprocket 35 and thence passes through idler rollers corresponding to rollers 28 and 29 on to the take-up reel.

The sound reproducing equipment is of a type well known in the art and is arranged to reproduce a sound record which takes the form of striations of varying degrees of translucency on the side of the film. Light from an incandescent lamp 36 is projected on to these striations by means of a lens tube 37. This lens tube includes a narrow physical slit on which the light of the lamp is focused. Further optical means in the lens tube are then utilized to focus an image of the slit on the film striations. The light after passing through the film and being varied in accordance with the light striations thereon, impinges on a photoelectric cell which is mounted in a completely shielded compartment 38. The current output of the photoelectric cell is varied in accordance with the light variations and after amplification may be used to operate sound reproducing equipment such as loud speakers.

The picture projector is provided with an objective lens 39 which registers with an aperture in the front panel of the cabinet. Illumination for the picture projector is obtained by means of a thousand-watt incandescent lamp which is mounted in a socket 40. This lamp is completely surrounded by a metal shield, a rear view of which may be seen in Fig. 3. The right hand view of the shield is indicated at 41. 42 is a red bull's-eye. A condensing lens mounting is indicated at 42. Rear views of ammeter 20, switch 18 and rheostat 19 show the manner in which they are mounted on the back of the rear panel. A driving motor 41 is mounted in the lower rear portion of the cabinet.

A thin metal fin 42 is mounted on the door and is perpendicular to the plane of the door. This fin cooperates with guard fins 43, 44 and 47 to form a light seal for the optical system of the sound reproducing equipment. It should be noted that the light seal formed by fins 42, 43, 44 and 47 is a highly desirable feature since the effect of the projector lamp on the sound reproducing equipment is decidedly marked, unless such precautions are taken to shut off light from this source.

Windows 45 and 46 permit inspection of the projector and sound reproducing equipment while the machine is in operation.

Referring now to Fig. 3, the driving interconnections of the machine will be described. This figure shows the left hand side of the cabinet with the door open. The motor drives a pulley wheel 50. This wheel, as does wheel 51, combines the functions of the pulley with that of a blower fan. The blower action is provided since it is desirable to provide air circulation to dissipate heat generated by various parts of the apparatus, more particularly, the considerable heat developed by the incandescent projector lamp. The air circulation is also desirable in maintaining moving air on the pressure gates of the projector and sound reproducing equipment. Pulleys 50 and 51 are interconnected by a driving pulley 52. Tension on the driving pulley is maintained by means of an idler 53, suitably mounted for rotation on an arm 54 which is spring pressed to force the idler pulley 53 to the right to take up any slack in the belt. Pulley 51 drives a shaft 55 which is the main driving shaft of the DeVry projector. This shaft extends through a frame member 56 and serves to operate the intermittent driving mechanism and miscellaneous feed rollers of the well known projector mechanism. A bevel gear is mounted on shaft 55 between pulley 51 and frame 56. This bevel gear, not shown in the drawings, cooperates with a bevel pinion. This pinion is mounted on a shaft 57 which terminates in a second bevel pinion. This pinion cooperates with a bevel gear, not shown, which drives a sleeve mounted on a shaft 58. This sleeve drives fly-wheel 59 through a resilient coupling made up of springs 60. This resilient driving connection is of the type fully disclosed in an application Serial No. 193,372, filed May 21, 1927, in the name of H. Pfannenstiehl. The resiliently driven fly-wheel imparts a particularly steady motion to shaft 58. Shaft 58 is the shaft on which the driving sprocket of the sound reproducing equipment is mounted. The resulting steady motion of this sprocket causes the film to pass the sound aperture at the uniform rate essential to good reproduction. A shaft 61 is drven by means of a pinion cooperating with the bevel gear on the sleeve of the resilient driving device. The shaft 61 terminates in a pinion 62 which drives a bevel gear 63. Rotary motion of the gear 63 is transmitted to the spindle on which the take-up reel is mounted by means of a friction clutch arrangement well known in the art and indicated generally at 64.

In the upper right hand portion of the cabinet is shown the metallic shield of the incandescent projector lamp.

In the lower left hand portion of the cabinet is shown a metallic casing 65 which houses a vacuum tube amplifier which is used to step up the output of the photoelectric cell. Vacuum tubes are indicated at 66 and 67. Access to these vacuum tubes may conveniently be had by means of a compartment door 68 which is shown open in the drawings but which is closed during operation of the machine.

The door of the machine is provided with screened apertures 69 and 70 to provide air intake for the ventilating fans.

In the operation of a machine of this type, care must be taken to prevent the heat generated by the projector lamp from adversely affecting the other apparatus. The projector lamp is isolated in a compartment formed by the cabinet and shields 42, 43 and 47. Fan 50 draws air through aperture 69 and forces the air upward through this compartment and out through an opening in the top of the casing. A second fan 51 draws air through aperture 70 and forces the air over the pressure gates of the projector and sound reproducing equipment. The presence of the shields 42, 43 and 47 prevents the heated air from the projector lamp from being blown onto the pressure gates. The complete enclosure of the film reels in the magazine, and the tight seal formed by the flanged ring 25 prevent the warm air in the interior of the casing from drying the film and rendering it brittle. The enclosure also serves as a useful precaution to prevent fire in the container reaching the film, or to isolate a fire in the magazine.

What is claimed is:

In a portable talking motion picture apparatus a casing, a door in said casing, a motion picture projecting device mounted in said casing, an illuminant for said projector, a light sensitive device controlled by the film passing through said projector, a shield attached to said casing and partially shielding said light sensitive device from said illuminant, and a second shield affixed to said door, and adapted to cooperate with said first shield to effectually shield said light sensitive device from said illuminant.

In witness whereof, I hereunto subscribe my name, this 8th day of August, 1928.

ROY V. TERRY.